US009799303B2

(12) United States Patent
Mizukoshi et al.

(10) Patent No.: US 9,799,303 B2
(45) Date of Patent: Oct. 24, 2017

(54) DISPLAY DEVICE

(76) Inventors: Seiichi Mizukoshi, Chigasaki (JP); Nobuyki Mori, Asaka (JP); Makoto Kohno, Yokohama (JP)

( * ) Notice: Subject to any disclaimer, the term of this patent is extended or adjusted under 35 U.S.C. 154(b) by 1303 days.

(21) Appl. No.: 13/390,934

(22) PCT Filed: Sep. 15, 2010

(86) PCT No.: PCT/US2010/048852

§ 371 (c)(1), (2), (4) Date: Jul. 13, 2012

(87) PCT Pub. No.: WO2011/034872

PCT Pub. Date: Mar. 24, 2011

(65) Prior Publication Data

US 2012/0268353 A1 Oct. 25, 2012

(30) Foreign Application Priority Data

Sep. 17, 2009 (JP) ................................ 2009-215747

(51) Int. Cl.

| | |
|---|---|
| ***G09G 3/20*** | (2006.01) |
| ***G09G 5/39*** | (2006.01) |
| ***H04N 9/69*** | (2006.01) |
| ***G09G 3/32*** | (2016.01) |
| ***G09G 5/02*** | (2006.01) |
| *G09G 3/3208* | (2016.01) |

(52) U.S. Cl.

CPC ............. *G09G 5/02* (2013.01); *G09G 3/2003* (2013.01); *G09G 3/3208* (2013.01); *G09G 2300/0452* (2013.01); *G09G 2340/0428* (2013.01); *G09G 2340/06* (2013.01)

(58) Field of Classification Search

CPC ....... G09G 2300/0452; G09G 2340/06; G09G 3/3208; G09G 2340/0457; G09G 3/2003; G09G 3/2044; G09G 5/39; H04N 9/69

USPC ..... 345/76, 88, 589, 600; 348/441; 705/14.5

See application file for complete search history.

(56) References Cited

U.S. PATENT DOCUMENTS

| | | | | |
|---|---|---|---|---|
| 5,844,532 | A * | 12/1998 | Silverbrook et al. | 345/89 |
| 6,453,067 | B1 | 9/2002 | Morgan et al. | |
| 6,753,854 | B1 | 6/2004 | Koyama et al. | |
| 7,791,621 | B2 | 9/2010 | Lin | |
| 7,889,166 | B2 | 2/2011 | Moon | |

(Continued)

FOREIGN PATENT DOCUMENTS

| | | |
|---|---|---|
| EP | 1 845 508 | 10/2007 |
| JP | 2006-003475 A | 1/2006 |

*Primary Examiner* — Lin Li

(57) ABSTRACT

An object of the invention is to convert input RGB data to R'G'B'W data without suffering loss of gradations of the input RGB data. A display panel 12 is configured having unit pixels made up of subpixels of RGBW (red, green, blue, white). In an RGB→R'G'B'W conversion section 10, conversion is carried out under conditions that usage rate of W is less than 100%, and a bit width of input RGB data us larger than a bit width of R'G'B'W data after conversion. In the RGB→R'G'B'W conversion section 10, R1G1B1values and W values are determined so that an absolute value of a sum of values obtained by multiplying differences between respective RGB data input and respective RGB components in R'G'B'W data after conversion by a weight, becomes minimum.

6 Claims, 13 Drawing Sheets

(56) References Cited

U.S. PATENT DOCUMENTS

| | | | | |
|---|---|---|---|---|
| 2004/0222999 | A1 | 11/2004 | Choi et al. | |
| 2005/0285828 | A1 | 12/2005 | Inoue et al. | |
| 2006/0214942 | A1* | 9/2006 | Tanase et al. | 345/589 |
| 2006/0244686 | A1 | 11/2006 | Higgins et al. | |
| 2007/0279372 | A1 | 12/2007 | Brown Elliott et al. | |
| 2008/0030526 | A1 | 2/2008 | Brown et al. | |
| 2008/0150863 | A1* | 6/2008 | Morisue et al. | 345/88 |
| 2008/0252797 | A1 | 10/2008 | Hamer et al. | |
| 2008/0297448 | A1* | 12/2008 | Mizukoshi et al. | 345/76 |
| 2009/0085847 | A1 | 4/2009 | Morisue et al. | |
| 2009/0135207 | A1 | 5/2009 | Tseng et al. | |
| 2009/0142000 | A1* | 6/2009 | Sono | 382/274 |
| 2010/0103201 | A1* | 4/2010 | Nakanishi et al. | 345/690 |

* cited by examiner

DISPLAY DEVICE

This application is a National Stage Entry of International Application No. PCT/US2010/048852, filed Sep. 15, 2010 and claims the benefit of Japanese Application No. 2009-215747, filed on Sep. 17, 2009, both of which are hereby incorporated by reference for all purposes as if fully set forth herein.

BACKGROUND OF THE INVENTION

1. Field of the Invention

The present invention relates to a display device having a single pixel made up of subpixels of RGBW (red, green, blue and white), that displays input RGB data by converting to R'G'B'W data.

2. Description of the Related Art

FIG. 1 shows one example of dot layout of a matrix type organic EL (OLED) panel having single pixels made up of three subpixels (dots) of ordinary red green and blue (R, G, B), and FIG. 2 shows dot layout of a matrix type EL panel that also uses white (W) in addition to R, G, B. In FIG. 2, RGBW are arranged in the horizontal direction, while in FIG. 3 RGBW are arranged grouped together in pixels of 2×2.

The RGBW type is intended to improve brightness and power reduction of a panel by using W bits that have higher light emitting efficiency than R, G, B. As a method of implementing an RGBW type panel, there is a method using organic EL elements that emit light of respective colors in each dot, and a method of implementing dots other than W by overlaying optical filters of red, green and blue on a white organic EL element.

FIG. 4 is a CIE 1931 color space chromaticity diagram, and shows one example of chromaticity of white (W) that uses a white pixel in addition to the normal primary colors of red, green and blue (R, G, B). This chromaticity of W does not always need to match a reference white color of a display.

FIG. 5 shows a method of converting RGB input signals, that can display reference white color of a display when R=1, G=1 and B=1, to RGBW pixel signals.

First, in the case where the emitted color of a W dot does not match the reference white color of the display, the following calculation is carried out on the input RGB signals to perform normalization to the emission color of the W dot (S11).

Equation 1.

$$\begin{bmatrix} Rn \\ Gn \\ Bn \end{bmatrix} = \begin{bmatrix} a & 0 & 0 \\ 0 & b & 0 \\ 0 & 0 & c \end{bmatrix} \times \begin{bmatrix} R \\ G \\ B \end{bmatrix} \quad \text{expression 1}$$

Here, R, G, B are input signals, Rn, Gn, Bn are red, green and blue signals that have been normalized, and a, b, c are coefficients that have been selected so that when R=1/a, G=1/b and B=1/c, respectively, they have the same brightness and chromaticity as W=1.

As an example of arithmetic expressions for the most fundamental S, F2, F3, the following can be considered:

$$S=\min(Rn,Gn,Bn) \quad \text{expression 2}$$

$$F2(S)=-S \quad \text{expression 3}$$

$$F3(S)=S \quad \text{expression 4}$$

In this case, for (Rn, Gn, Bn) obtained in S11, in step S12 S (minimum values within RGB components that have been normalized) is calculated from expression 2 (S12), and Rn', Gn', Bn' are obtained by subtracting the obtained S from Rn, Gn, Bn (S13, S14). Also, S is output directly as a white value (Wh) (S15).

In this case, it will be understood that as the color of a pixel to be displayed approaches an achromatic color, the proportion of a W dot that is lit up is increased. The power consumption of a panel therefore decreases as the proportion of color approaching an achromatic color increases within a displayed image, compared to when using RGB only.

Also, similarly to normalization to the emission color of a W dot, when the emission color of a W dot does not match reference white of the display, final normalization to reference white is carried out (S16). This final normalization to reference white is carried out as follows.

Equation 2.

$$\begin{bmatrix} R' \\ G' \\ B' \end{bmatrix} = \begin{bmatrix} 1/a & 0 & 0 \\ 0 & 1/b & 0 \\ 0 & 0 & 1/c \end{bmatrix} \times \begin{bmatrix} Rn \\ Gn \\ Bn \end{bmatrix} \quad \text{expression 5}$$

Normally, there are few images made up of only pure colors, and there are hardly any cases where W dots are used, which means that overall power consumption is lowered on average compared to when using only RGB pixels.

Also, in the case where M is defined as $0 \le M \le 1$, and the following expressions used in F2 and F3, usage rate of the W dots will vary depending on the value of M.

$$F2(S)=-MS \quad \text{expression 6}$$

$$F3(S)=MS \quad \text{expression 7}$$

From the point of view of power consumption, it is best if M=1, that is, if usage efficiency is 100%. However, from the point of view of visual resolution it is better to select a value of M such that all of RGBW are lit to the greatest extent possible (refer to patent publication 1).

FIG. 6 is a schematic drawing of a conversion method when normalization is not carried out. For an input signal, minimum values S within RGB are obtained (S21), and the obtained values S are multiplied by a coefficient M to determine white (Wh) (S22). Together with outputting this Wh, it is subtracted from respective RGB components (S23) to obtain finally converted R', G', B'.

PRIOR ART REFERENCES

Patent Publications

Patent document 1: JP No. 2006-003475A

SUMMARY OF THE INVENTION

In a display device having these type of RGBW subpixels and with a usage rate of W set to less than 100%, in the case where RGB signals of a wider bit width than the input bit width of a D/A converter of a RGBW source driver have been input, display is carried out while keeping loss of input signal gradation to the minimum possible.

The present invention is directed to a display device having unit pixels made up of RGBW (red, green, blue, white) subpixels and a usage rate of W set to less than 100%, in which a bit width of input RGB data is wider than a bit width of R'G'B'W data after conversion, wherein R'G'B' values and W values are determined such that differences between respective input RGB data and respective RGB components within converted R'G'B'W data, or an absolute value of a sum of values resulting from multiplication of these differences by a weight, become minimum.

The present invention is also directed to a display device having unit pixels made up of RGBW (red, green, blue, white) subpixels and a usage rate of W set to less than 100%, in which a bit width of input RGB data is wider than a bit width of R'G'B'W data after conversion, wherein R'G'B' values and W values are determined such that differences in chromaticity respectively calculated from input RGB data and RGB components within converted R'G'B'W data become minimum.

It is also preferable, if a target W usage rate is made m/n (where m and n are relatively prime positive integers, and m<n), a value obtained by rounding off a minimum value within the three colors of input RGB data to a number of bits supplied to a panel is made $W_0$, and a value obtained by truncating n/2 after the decimal point is expressed as [n/2], to select W data from within a range of values greater than or equal to $W_0$+[n/2] and less than or equal to $W_0$−[n/2].

It is also preferable, when a bit width of input RGB data is t, and a bit width of R'G'B'W data supplied to a display panel is u, to use n such that $n=2^{(t-u)}$.

Effect of the Invention

According to the present invention, for input signals having a greater number of gradations than a maximum number of gradations of a display panel, display is carried out with as little loss in gradation as possible.

DESCRIPTION OF THE PREFERRED EMBODIMENTS

Figure 1:
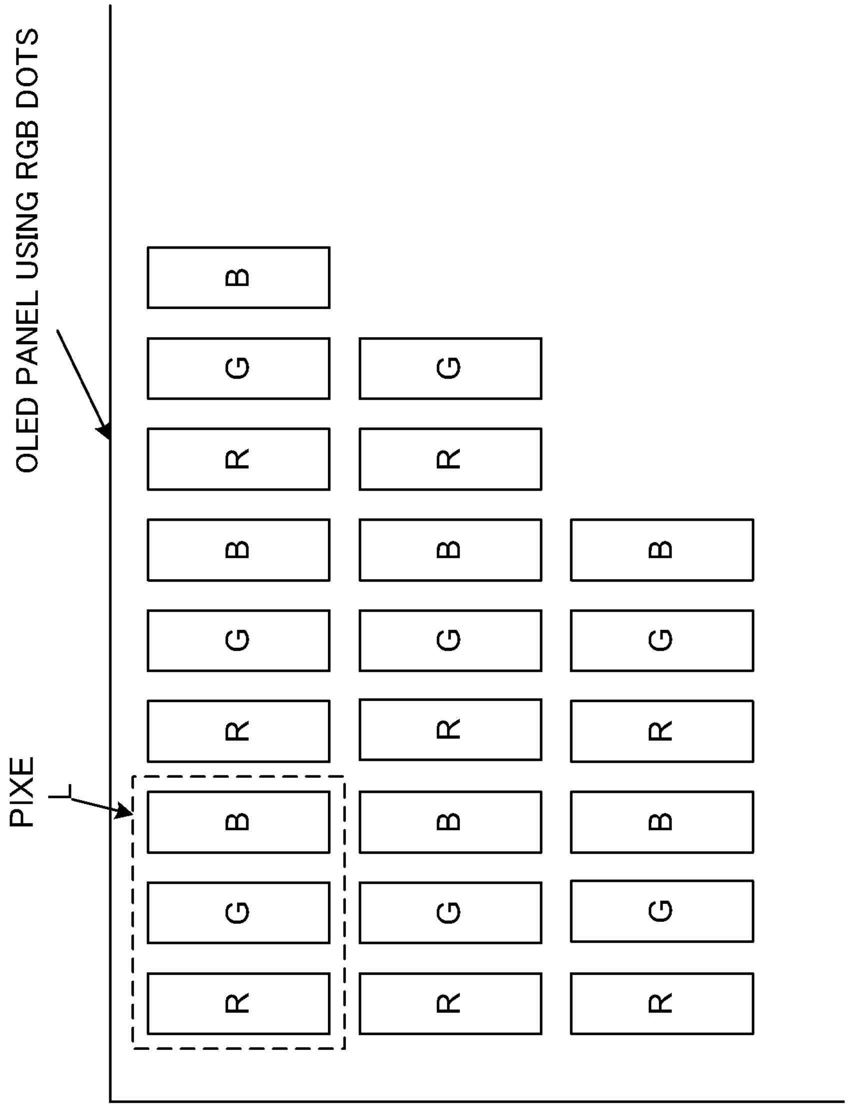
FIG. 1 is a drawing showing a subpixel structural example for an organic EL panel using RGB dots.
Figure 2:
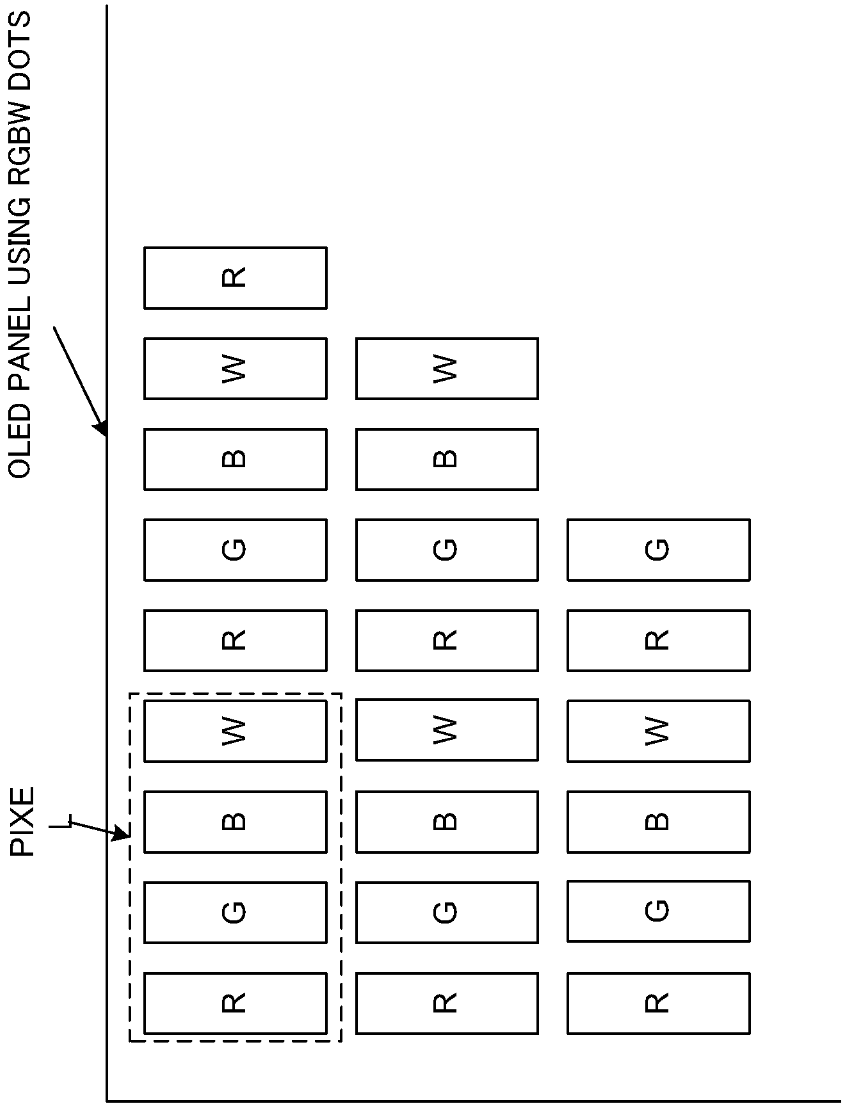
FIG. 2 is a drawing showing a subpixel structural example for an organic EL panel using RGBW dots.
Figure 3:
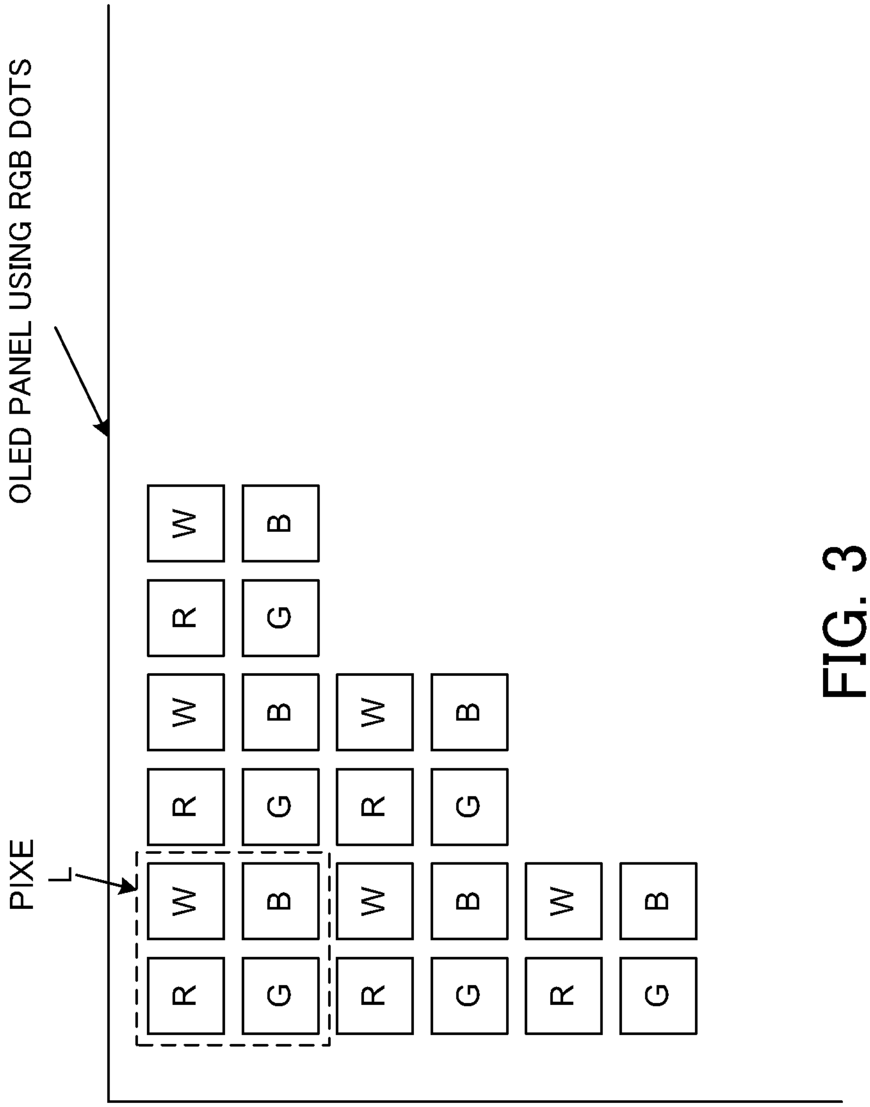
FIG. 3 is a drawing showing a subpixel structural example for an organic EL panel using RGBW dots.
Figure 4:
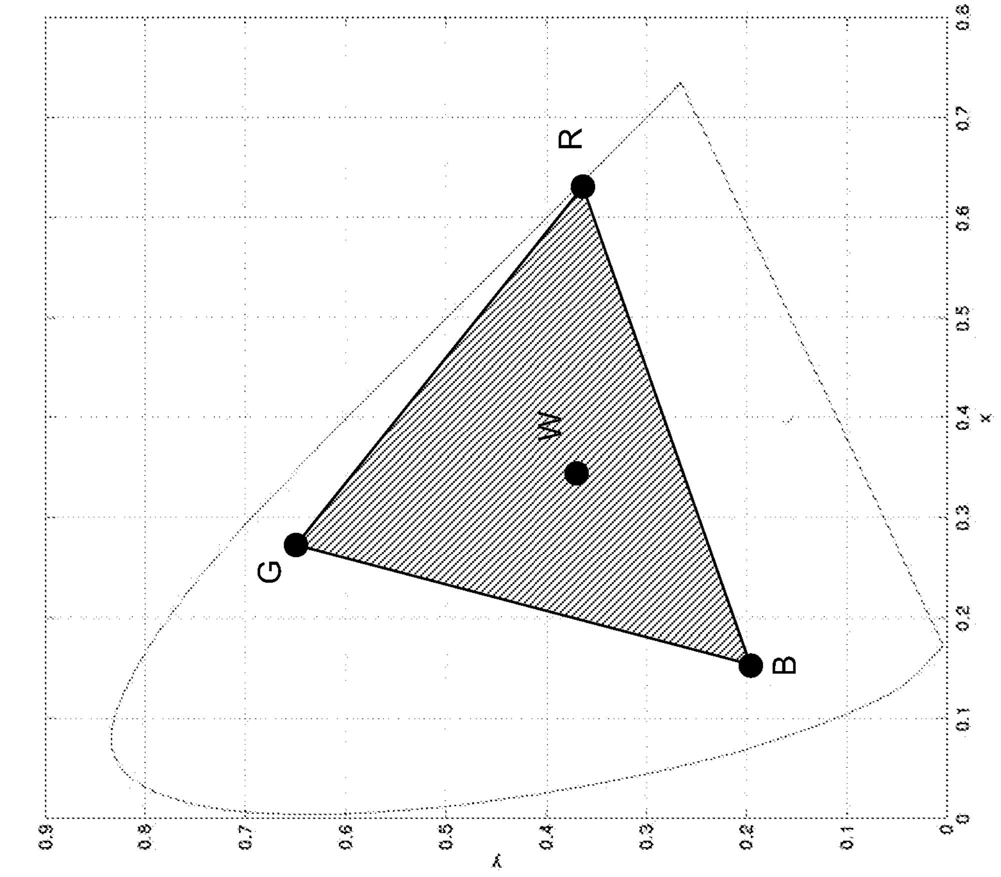
FIG. 4 is a drawing representing color positions of pure colors RGBW on the CIE 1931 color space chromaticity diagram.
Figure 5:
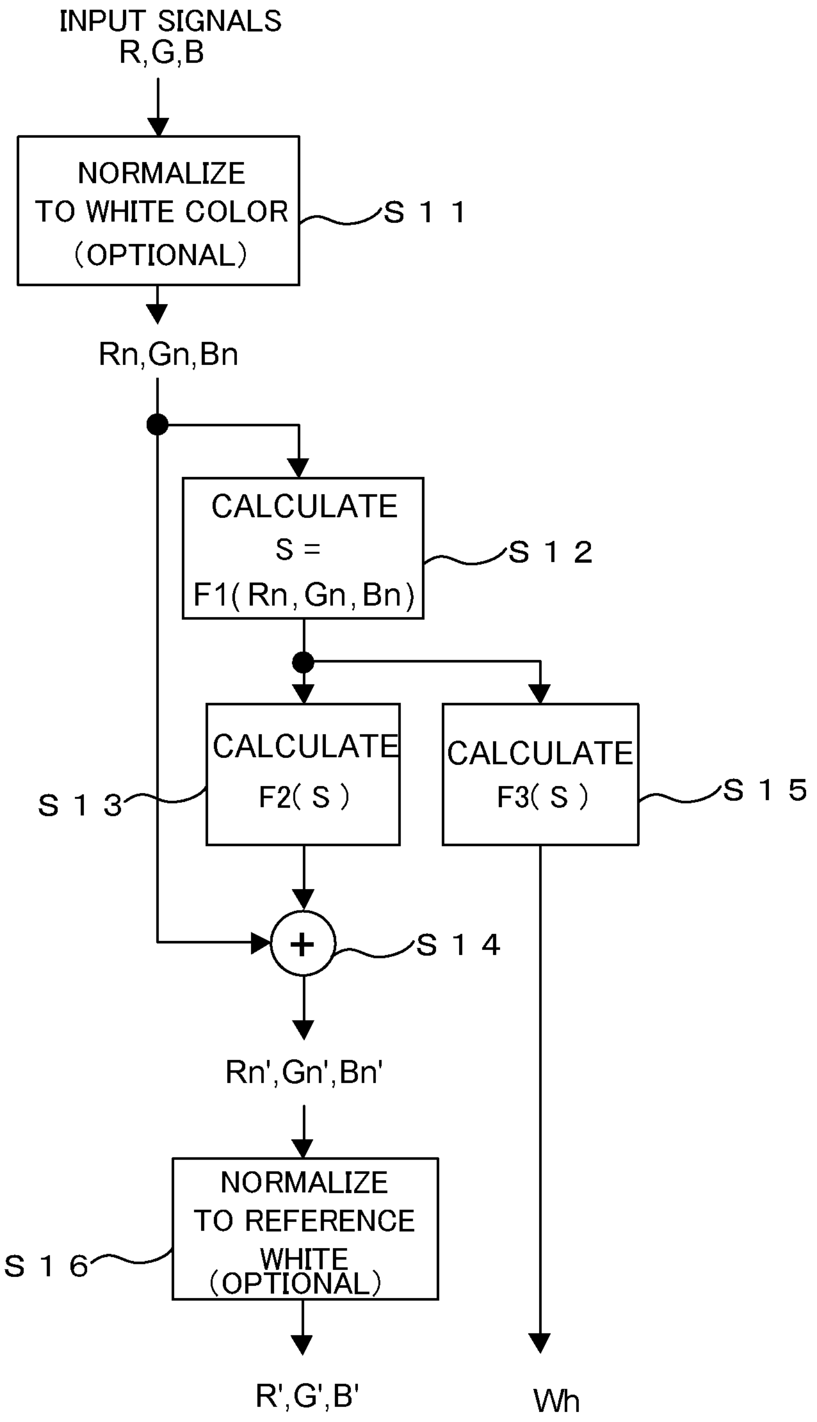
FIG. 5 is a drawing showing an example of processing to convert RGB input signals to RGBW image signals.
Figure 6:
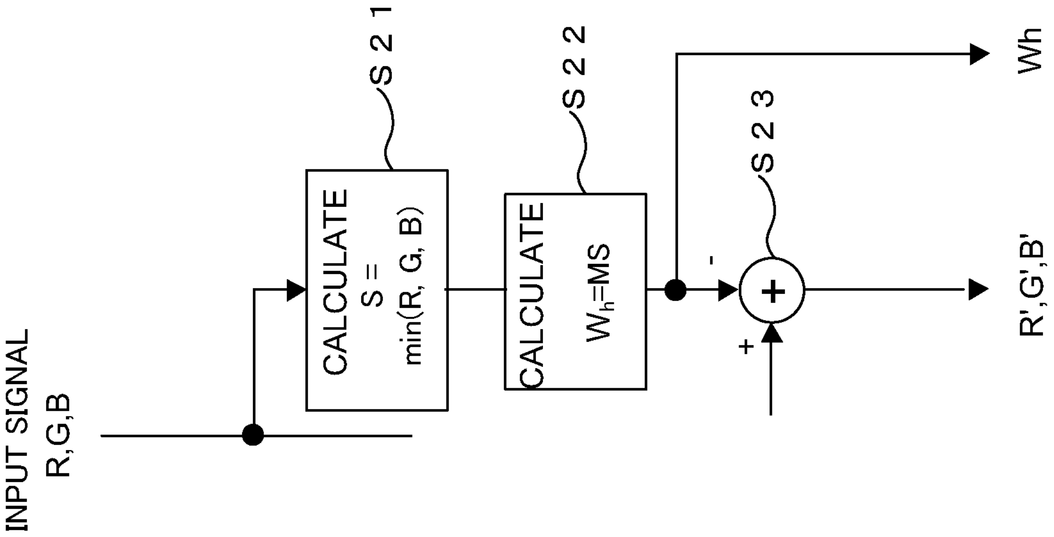
FIG. 6 is a drawing showing another example of processing to convert RGB input signals to RGBW image signals.

Embodiments of the present invention will be described in the following.

Description of Conversion Content

With t≥u, input RGB are made t bits for respective colors, and R'G'B'W are made u bits for respective colors. Also, with the upper u bits of input RGB an integer part and lower (t−u) bits a decimal fraction part, R'G'B'W after conversion can be considered as an integer. If light amount is proportional to input data, a theoretical light amount of each color is represented as:

$$L_{r1}=k_rR \quad \text{expression 8}$$

$$L_{g1}=k_gG \quad \text{expression 9}$$

$$L_{b1}=k_bB \quad \text{expression 10}$$

Here, $k_r$, $k_g$ and $k_b$ are proportional constants.

Also, a light emission amount after conversion, when a usage rate M of W is m/n (where m and n are positive integers, and m≤n), becomes:

$$L_{r2}=k_rR'+k_r(m/n)W \quad \text{expression 11}$$

$$L_{g2}=k_gG'+k_g(m/n)W \quad \text{expression 12}$$

$$L_{b2}=k_bB'+k_b(m/n)W \quad \text{expression 13}$$

If the bit widths are the same, and the maximum number of gradations are the same, for R', G' and B' and W, a coefficient of W becomes m/n times the coefficient of R', G', and B', and so it will be understood that a light emission amount corresponding to one gradation of W becomes m/n times the light emission amount for that gradation of R', G', B'.

Here, if W' is an integer, and p is an integer where 0≤p<n, then (m/n)W is expressed in the form (m/n)W=W'+p/n, and expressions 11 to 13 can be rewritten as:

$$L_{r2}=k_r(R'+W'+p/n) \quad \text{expression 14}$$

$$L_{g2}=k_g(G'+W'+p/n) \quad \text{expression 15}$$

$$L_{b2}=k_b(B'+W'+p/n) \quad \text{expression 16}$$

Since a number of bits of R'G'B'W is less than the number of bits of input RGB, there is a possibility of an error arising at the time of conversion, and errors ΔLr, ΔLg and ΔLb in light emission amount for each color become:

$$\Delta L_r=L_{r1}-L_{r2}=k_r(R-(R'+W'+p/n)) \quad \text{expression 17}$$

$$\Delta L_g=L_{g1}-L_{g2}=k_g(G-(G'+W'+p/n)) \quad \text{expression 18}$$

$$\Delta L_b=L_{b1}-L_{b2}=k_b(B-(B'+W'+p/n)) \quad \text{expression 19}$$

となる。

Here values of R', G', B' are selected so that integer components of $\Delta L_r/k_r$, $\Delta L_g/k_g$, and $\Delta L_b/k_b$ become zero, and so $\Delta L_r/k_r$, $\Delta L_g/k_g$, and $\Delta L_b/k_b$ become values less than 1. Also, p differs with the value of W, and there candidates for n of 0, 1/n, 2/n, . . . (n−1). Accordingly, errors $\Delta L_r$, $\Delta L_g$ and $\Delta L_b$ also have respective n progressions, which means that if W is selected so as to get a minimum from these, it is possible to minimize the error. Values of p/n for the candidates of n all exist in a range from an arbitrary W to W+N−1, and values of W are are the same values when incremented by a (a positive integer less than n) and when reduced (n−a).

For a real number x, a maximum integer that does not exceed x is expressed as [x], and ordinarily, a value of W is obtained using:

$$W_0=[\min(R,G,B)] \quad \text{expression 20}$$

For the above mentioned $W_0$, values of W that make errors minimum in a range of greater than or equal to $W_0-[n/2]$, and less than or equal to $W_0+[n/2]$, definitely exist, which means that when the usage rate of W is comes as close as possible to m/n it is possible to select W to make errors minimum in that range. However, it is necessary for (m/n)W to satisfy $$0 \leq (m/n)W \leq \min(R,G,B)$$

The structure of embodiments of the present invention will be described in the following based on the drawings.

Embodiment 1

Figure 7:
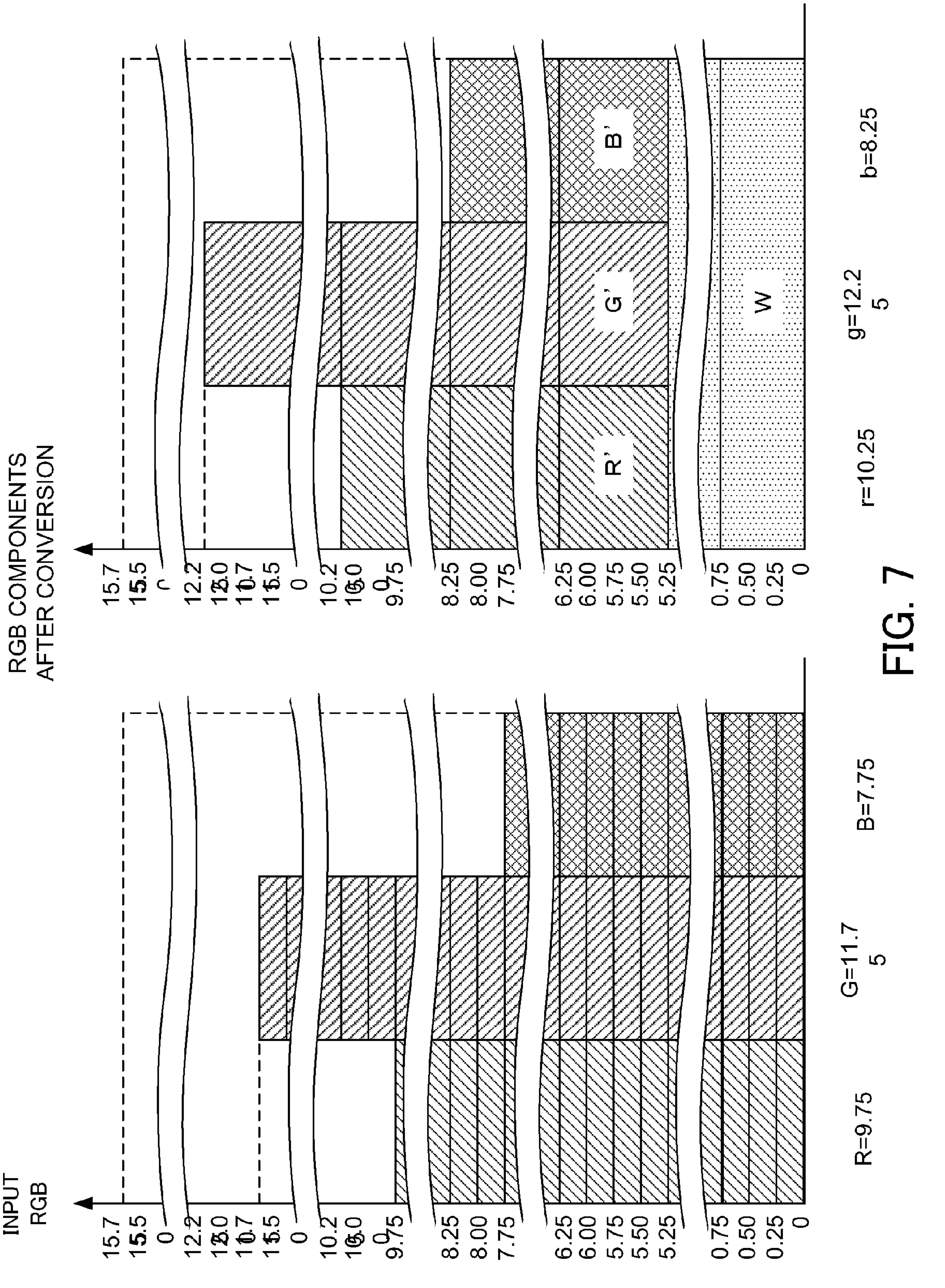
FIG. 7 is a drawing showing an example of states of input RGB and R'G'B'W after conversion.

FIG. 7 is an example of obtaining values for four bits of R', G', B' and W for each color from RGB input signals of 6 bits for each color, with a W usage rate of M=¾, using a conventional method.

If input RGB is an integer section of 4 bits and a decimal fraction section of 2 bits, and each color made R=9.75, F=11.75, B=7.75, $$(m/n)W_0=(m/n)[\min(9.75,11.75,7.75)]=(3/4)\times[7.75]=(3/4)\times 7=5.25$$

Here, if R', G', B' are obtained using the obtained $(m/n)W_0$, then:

$$R'=[R-(m/n)W_0+0.5]=[9.75-5.25+0.5]=[5.0]=5$$

$$G'=[G-(m/n)W_0+0.5]=[11.75-5.25+0.5]=[7.0]=7$$

$$B'=[B-(m/n)W_0+0.5]=[7.75-5.25+0.5]=[3.0]=3$$

Here, respectively adding 0.5 at the end is to round up the fraction.

If RGB components r, g, b at this time are obtained, then $$r=R'+(m/n)W_0=5+5.25=10.25$$

$$g=G'+(m/n)W_0=7+5.25=12.25$$

$$b=B'+(m/n)W_0=3+5.25=8.25$$

becoming values that are offset from input RGB by 0.5 for each color.

Every time 1 is either added to or subtracted from the value of $W_0$, the value of each color is increased or decreased by m/n=¾=0.75, and so it will be understood that if 2 is added to or taken away from $W_0$ an error will be removed. In this case, if R', G' B' are calculated with a new value of W then in the case of W=9, $$R'=[R-(m/n)W+0.5]=[9.75-6.75+0.5]=[3.5]=3$$

$$G'=[G-(m/n)W+0.5]=[11.75-6.75+0.5]=[5.5]=5$$

$$B'=[B-(m/n)W+0.5]=[7.75-6.75+0.5]=[1.5]=1$$

and in the case of W=5, $$R'=[R-(m/n)W+0.5]=[9.75-3.75+0.5]=[6.5]=6$$

$$G'=[G-(m/n)W+0.5]=[11.75-3.75+0.5]=[8.5]=8$$

$$B'=[B-(m/n)W+0.5]=[7.75-3.75+0.5]=[4.5]=4$$

For both situations, errors between the input RGB and the RGB components after conversion become $$R-(R'+(m/n)W)=0$$

$$G-(G'+(m/n)W)=0$$

$$B-(B'+(m/n)W)=0$$

Figure 8:
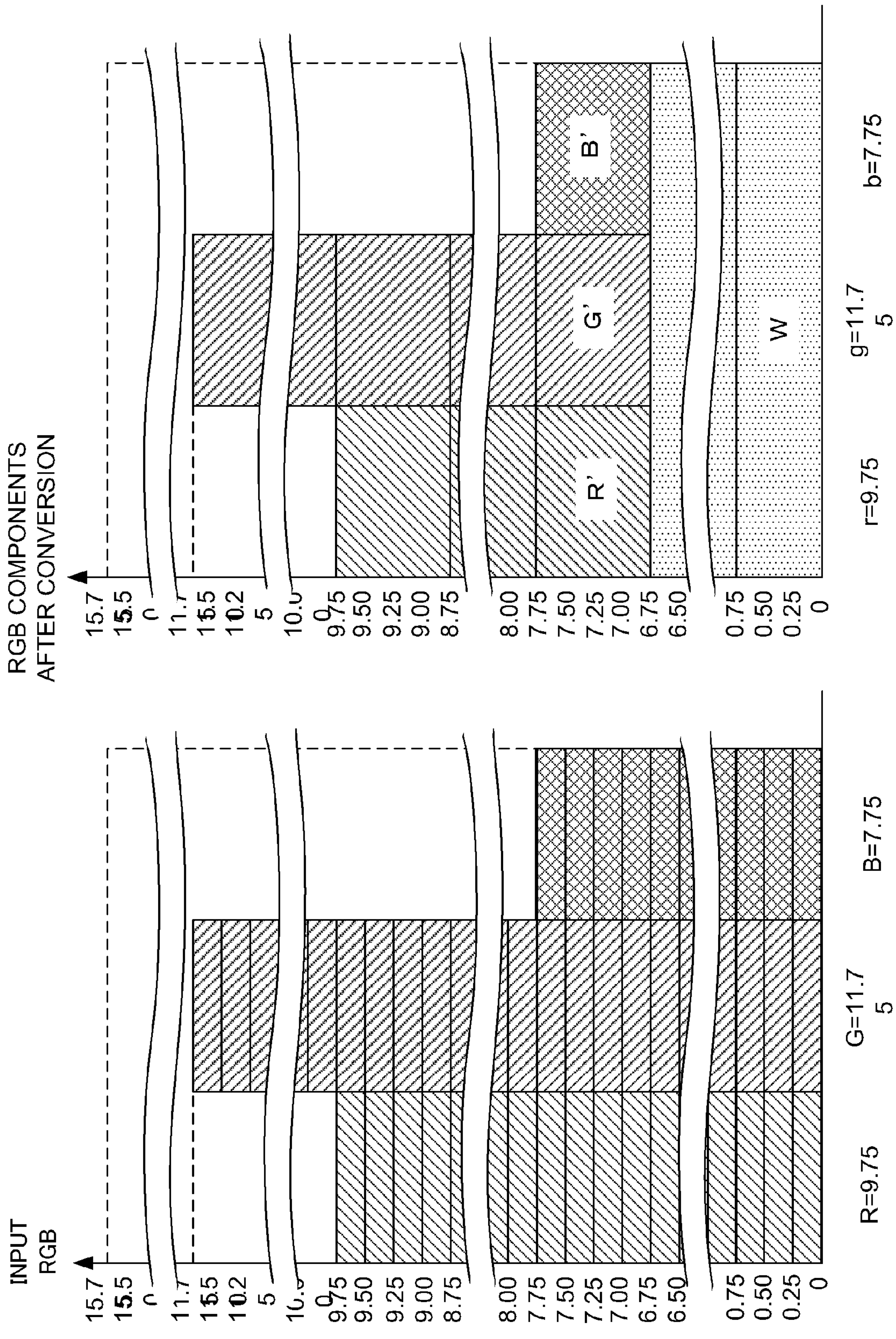
FIG. 8 is a drawing showing another example of states of input RGB and R'G'B'W after conversion.

FIG. 8 shows the case where W=9.

The fractional part of RGB is expressed as $q(1/2)^{(t-u)}$, where q is an integer satisfying $0<q<q^{(t-u)}$. Accordingly, when n is equal to $2^{(t-u)}$, a value of p exists where $p/n=q(1/2)^{(t-u)}$, that is, where p=q, and by appropriately selecting W it is possible to make an error 0.

With this embodiment, the above conditions are satisfied with (t−u)=2, and since the fractional part is the same for all three colors it is possible to make errors for all three colors 0. In other words, it is possible to find values of W that can express input gradations directly. As a particular example, in the case where a monochrome image with equal RGB values is input, it is always possible to carry out display corresponding to the input RGB gradations.

Embodiment 2

Similarly to embodiment 1, 4 bit R'G'B'W values for each color are obtained from RGB input signals of 6 bits for each color, but the usage efficiency M of W is made M=⅗.

Figure 9:
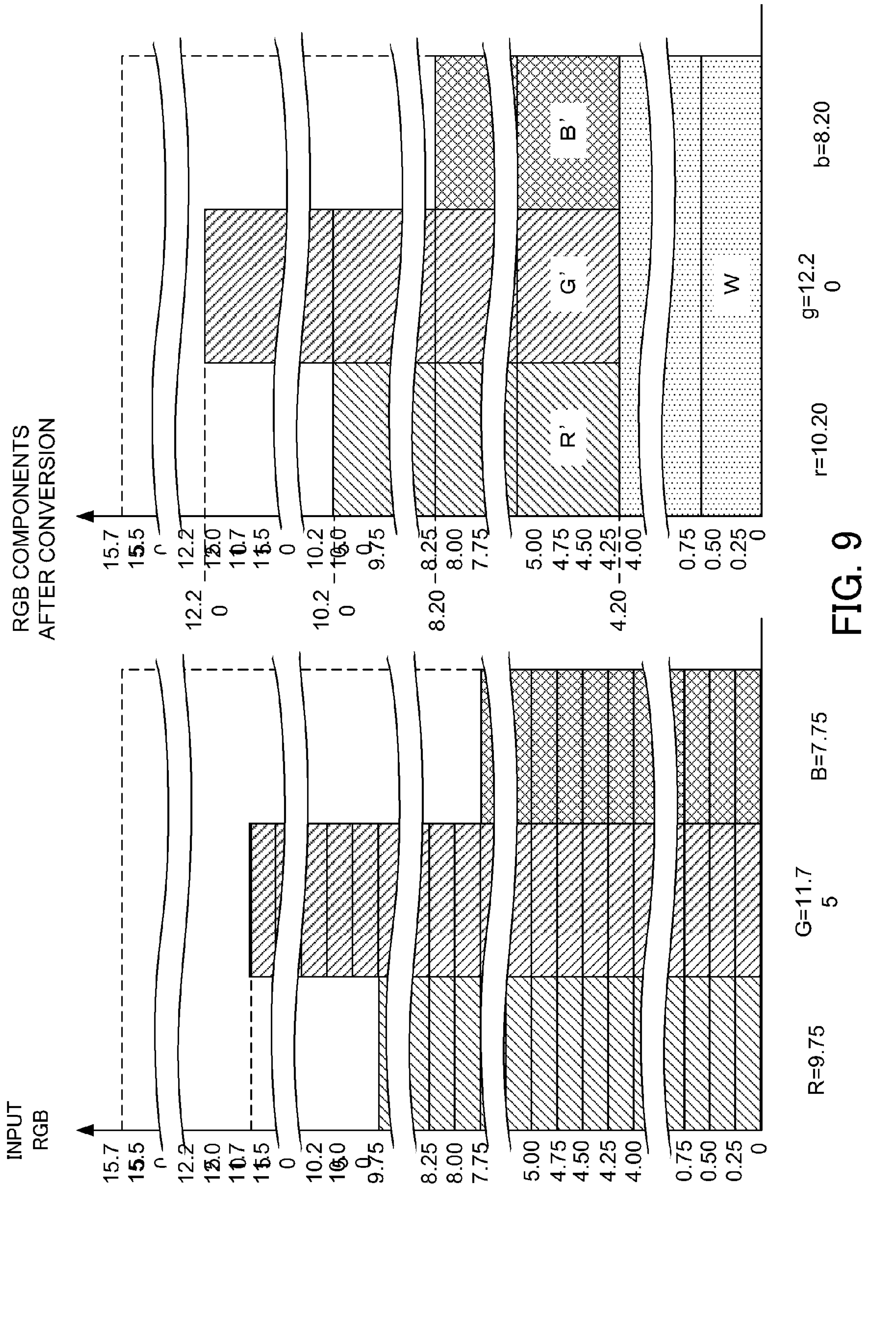
FIG. 9 is a drawing showing yet another example of states of input RGB and R'G'B'W after conversion.

FIG. 9 is an example obtained with a conventional method. If input RGB has each color set to R=9.75, G=11.75, and B=7.75, $$(m/n)W_0=(m/n)[\min(0.75,11.75,7.75)]=(3/5)\times[7.75]=(3/5)\times 7=4.2.$$

Here, if R', G', B' are obtained using the obtained $(m/n)W_0$, then:

$$R'=[R-(m/n)W_0+0.5]=[9.75-4.20+0.5]=[6.05]=6$$

$$G'=[G-(m/n)W_0+0.5]=[11.75-4.20+0.5]=[8.50]=8$$

$$B'=[B-(m/n)W_0+0.5]=[7.75-4.20+0.5]=[4.05]=4$$

If RGB components r, g, b at this time are obtained, then $$r=R'+(m/n)W_0=6+4.20=10.20$$

$$g=G'+(m/n)W_0=8+4.20=12.2$$

$$b=B'+(m/n)W_0=4+4.20=8.2$$

Here, if differences between input RGB and values of RGB components after conversion are obtained, $$R-r=9.75-10.20=-0.45$$

$$G-g=11.75-12.20=-0.45$$

$$B-b=7.75-8.20=-0.45$$

p/n obtained by changing the value of W is any one of 0, 0.2, 0.4, 0.6 and 0.8, and the closest to 0.75 is 0.8

If 1 is added to the value of $W_0$, then $(m/n)W=(m/n)\times 8=0.6\times 8=4.8$, and it will be understood that a value making errors minimum close to W=7 is W=8, where 1 has been added to $W_0$.

If R', G', B' are calculated with this value of W, then $$R'=[R-(m/n)W+0.5]=[9.75-4.80+0.5]=[5.45]=5$$

$$G'=[G-(m/n)W+0.5]=[11.75-4.80+0.5]=[7.45]=7$$

$$B'=[B-(m/n)W+0.5]=[7.75-4.8+0.5]=[3.45]=3$$

RGB components rgb become $$R=R'+(m/n)W=5+4.80=9.80$$

$$g=G'+(m/n)W=7+4.80=11.80$$

$$b=B'+(m/n)W=3+4.80=7.80$$

and errors from input RGB become $$R-r=9.75-9.80=-0.05$$

$$G-g=11.75-11.80=-0.05$$

$$B-b=7.75-7.80=-0.05$$

Figure 10:
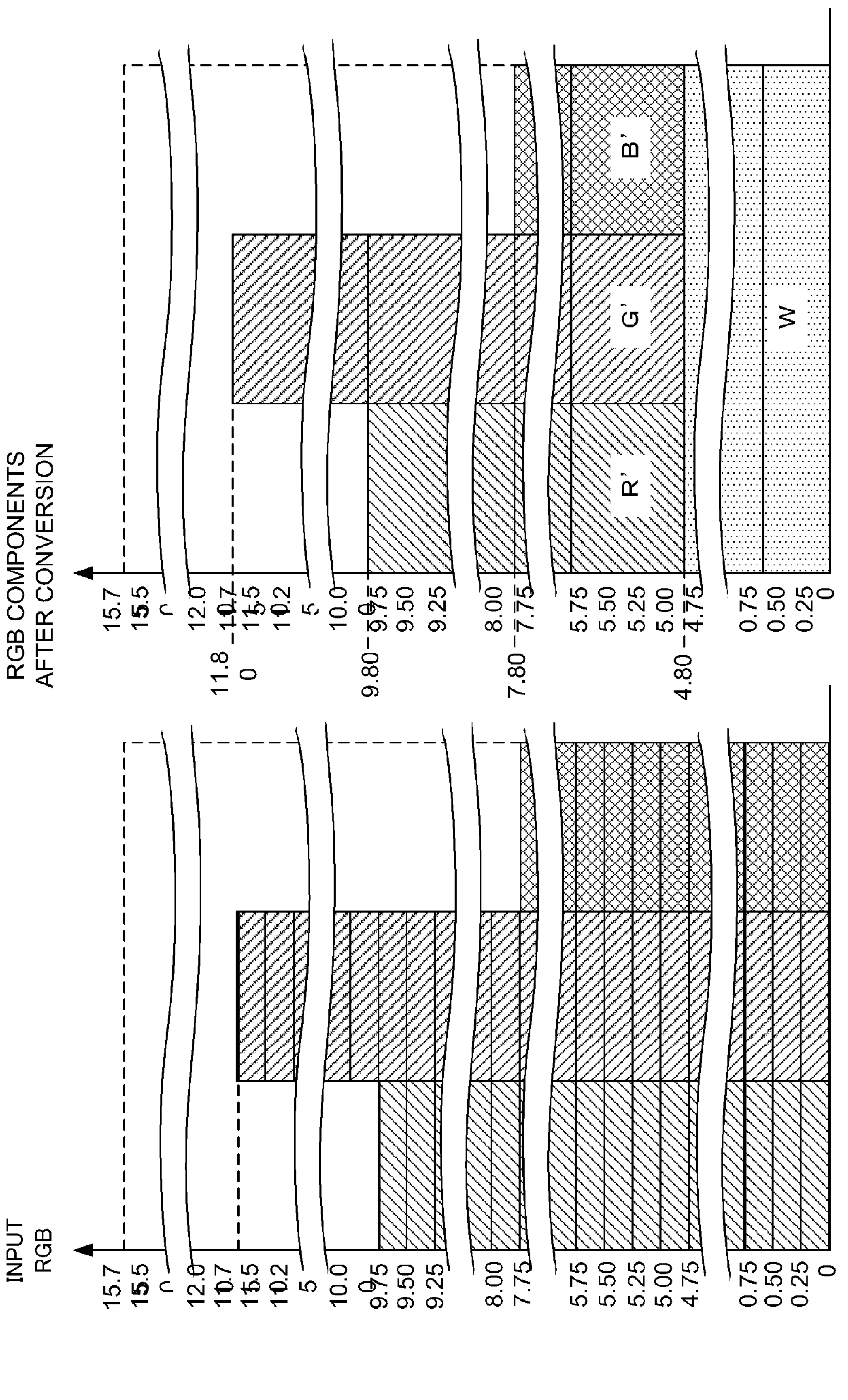
FIG. 10 is a drawing showing still another example of states of input RGB and R'G'B'W after conversion.

FIG. 10 shows a relationship between input RGB and RGB components after conversion, for the case where W=8.

With the above described embodiment, the usage rate of the finally determined W value is off slightly from the target value m/n, but this is due to the fact that the bit width of R'G'B'W is small at 4 bits. Also, when n is made large, the effect on the usage rate of W becomes large.

With the above described embodiment, fractional parts of input RGB are all the same, which means that the optimum value of W is the same for any color. In the event that fractional parts are different for each color, it is preferable to change a method of selecting a value of the fractional parts as follows, such as in the following (1) and (2).

(1) With this example, R'G'B' values and W values are determined so that an absolute value of a sum of differences between respective RGB data input and respective RGB components in R'G'B'W data after conversion becomes minimum.

As an example, with a difference in bit widths between input RGB and R'G'B'W input of 2 bits, input of R=9.75, G=11.25 and B=7.00 will be considered. When usage rate M of W=⅗, $$(m/n)W_0=(m/n)[\min(9.75,11.25,7.00)]=(3/5)\times[7.00]=(3/5)\times 7=4.20.$$

Here, if R', G', B' are obtained using the obtained (m/n) $W_0$, then:

$$R'=[R-(m/n)W_0+0.5]=[9.75-4.20+0.5=[6.05]=6$$

$$G'=[G-(m/n)W_0+0.5]=[11.25-4.20+0.5=[7.55]=7$$

$$B'=[B-(m/n)W_0+0.5]=[7.00-4.20+0.5=[3.3]=3$$

If RGB components r, g, b at this time are obtained, then $$r=R'+(m/n)W_0=6+4.20=10.20$$

$$g=G'+(m/n)W_0=7+4.20=11.20$$

$$b=B'+(m/n)W_0=3+4.20=7.2$$

Here, if differences between input RGB and values of RGB components after conversion are obtained, $$R-r=9.75-10.20=-0.45$$

$$G-g=11.25-11.20=0.05$$

$$B-b=7.00-7.20=-0.20$$

An absolute value of a sum of differences between respectively input RGB and RGB components after conversion becomes:

$$|(R-r)+(G-g)+(B-b)|=|(9.75-10.2)+(11.25-11.20)+(7.00-7.20)|=0.6$$

Similarly, if absolute values of a sum of differences are obtained with W set to ($W_0$−2), ($W_0$−1), ($W_0$+1) and ($W_0$+2), then $$|(9.75-10.00)+(11.25-11.00)+(7.00-7.00)|=0.00$$

$$|(9.75-9.60)+(11.25-11.60)+(7.00-6.60)|=0.20$$

$$|(9.75-9.80)+(11.25-10.80)+(7.00-6.80)|=0.62$$

$$|(9.75-9.40)+(11.25-11.40)+(7.00-7.40)|=0.20$$

are respectively obtained, and among them a value of W that constitutes a minimum value 0.00 becomes ($W_0$−2)=5.

It is also possible to multiply the respective differences by a weight. For instance, brightness components make a large contribution to the visible gradation characteristics, but the size of a brightness component differs for each color. Accordingly, is preferable to multiply the brightness component of each color by an appropriate weight. If weights for each color of RGB are respectively made 0.3, 0.6 and 0.1, $$|0.3(9.75-10.20)+0.6(11.25-11.20)+0.1(7.00-7.20)|=0.125$$

$$|0.3(9.75-10.00)+0.6(11.25-11.00)+0.1(7.00-7.20)|=0.075$$

$$|0.3(9.75-9.60)+0.6(11.25-11.60)+0.1(7.00-6.60)|=0.125$$

$$|0.3(9.75-9.80)+0.6(11.25-10.80)+0.1(7.00-6.80)|=0.275$$

$$|0.3(9.75-9.40)+0.6(11.25-11.40)+0.1(7.00-7.40)|=0.025$$

are respectively obtained, and among them a value of W that constitutes a minimum value 0.025 becomes ($W_0$+2)=9.

Figure 11:
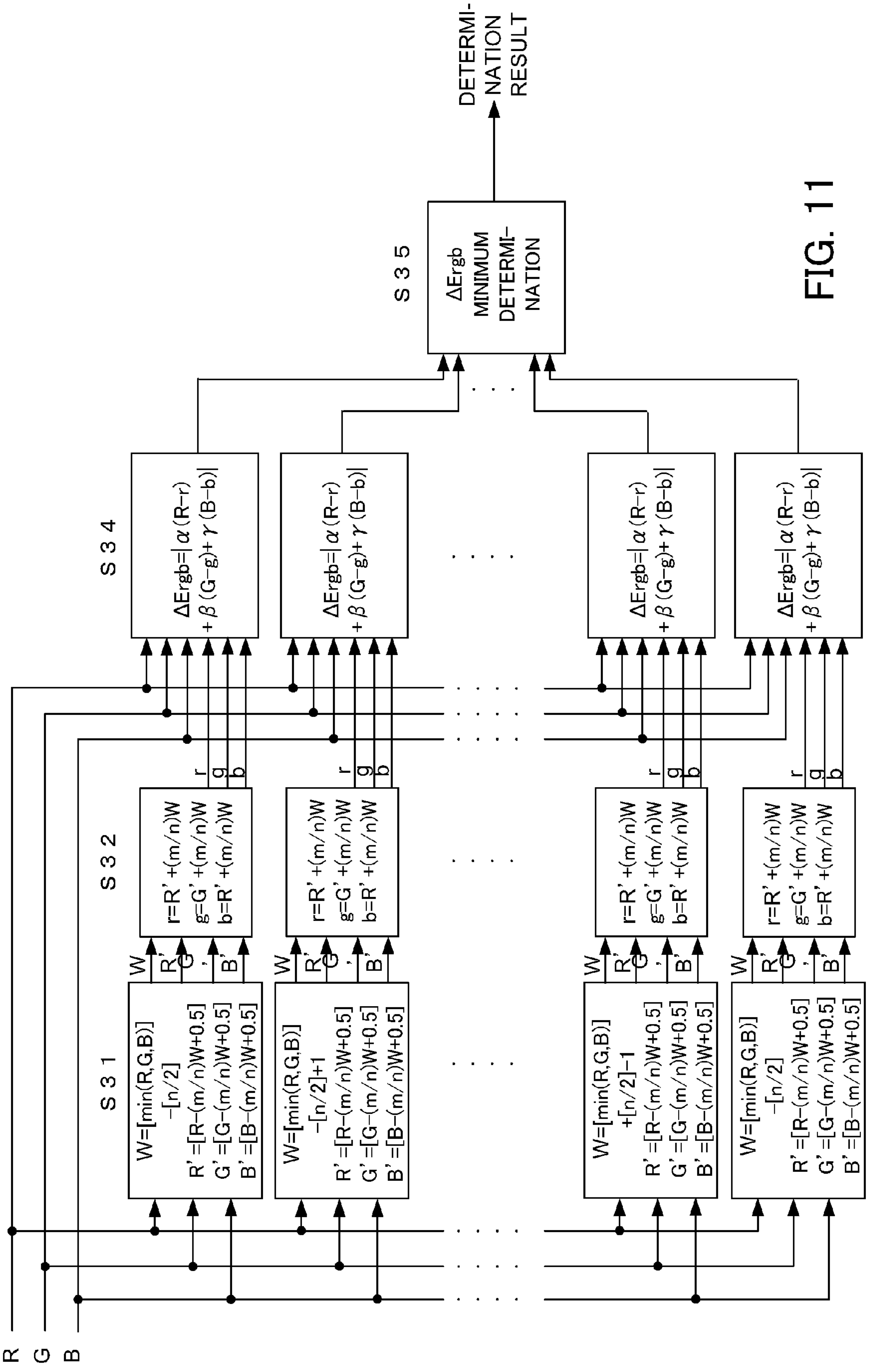
FIG. 11 is a drawing showing a structural example for performing judgement to determine W.

FIG. 11 is a block diagram of a determination section.

W is subjected to multiple category determination based on minimum values of input RGB. At this time, W is determined by adding integers in a range of −[n/2] to +[n/2] to a value $W_0$ that is obtained by rounding minimum values min(R, G, B) of input RGB to a specified number of bits (S31). Here, [n/2] is a value obtained by truncating after the decimal point. Also, a value obtained by truncating a minimum value among the three colors of input RGB data and rounding to a number of bits supplied to the panel is made $W_0$=[min(R, G, B)], being a fundamental value of W, but when rounding to a number of bits supplied to the panel it is also possible to do so by rounding off or rounding up after the decimal point.

Next, (m/n)W is added to the obtained R', G', B', and r, g, b in RGB components at that time are obtained (S32). Next, based on the obtained r, g, b corresponding to each W, a total of absolute values of errors from original RGB are calculated (S34). With this example, the total of errors is calculated by weighted addition. A value for W is then determined by selecting the minimum from among the obtained absolute values for errors (S35).

(2) With the example of FIG. 11, W was determined such that a total of errors for respective RGB components becomes minimum. With this example, W is determined such that with a color coordinate system such as L*u*v*, or L*a*b*, color differences become minimum.

With both systems, with the color coordinate system recommended by CIE in 1976, a fixed distance within the coordinate system is determined so that in any region there are errors at an almost perceptually uniform rate. Accordingly, L*u*v* or L*a*b* before and after conversion are obtained, and a value of a fractional part is selected such that color differences defined by the respective expressions below become minimum.

$$\Delta Euv=((\Delta L^*)^2+(\Delta u^*)^2+(\Delta v^*)^2)^{1/2} \quad \text{expression 21}$$

Here, ΔL*, Δu* and Δv* are respective differences between L*, u* and v* before and after conversion.

$$\Delta Eab=((\Delta L^*)^2+(\Delta a^*)^2+(\Delta b^*)^2)^{1/2} \quad \text{expression 22}$$

Here, ΔL*, Δa* and Δb* are respective difference in L*, a* and b* before and after conversion.

Also, for simplicity, it is possible to calculate only ΔL*, and select a value of W so that this is made minimum.

Figure 12:
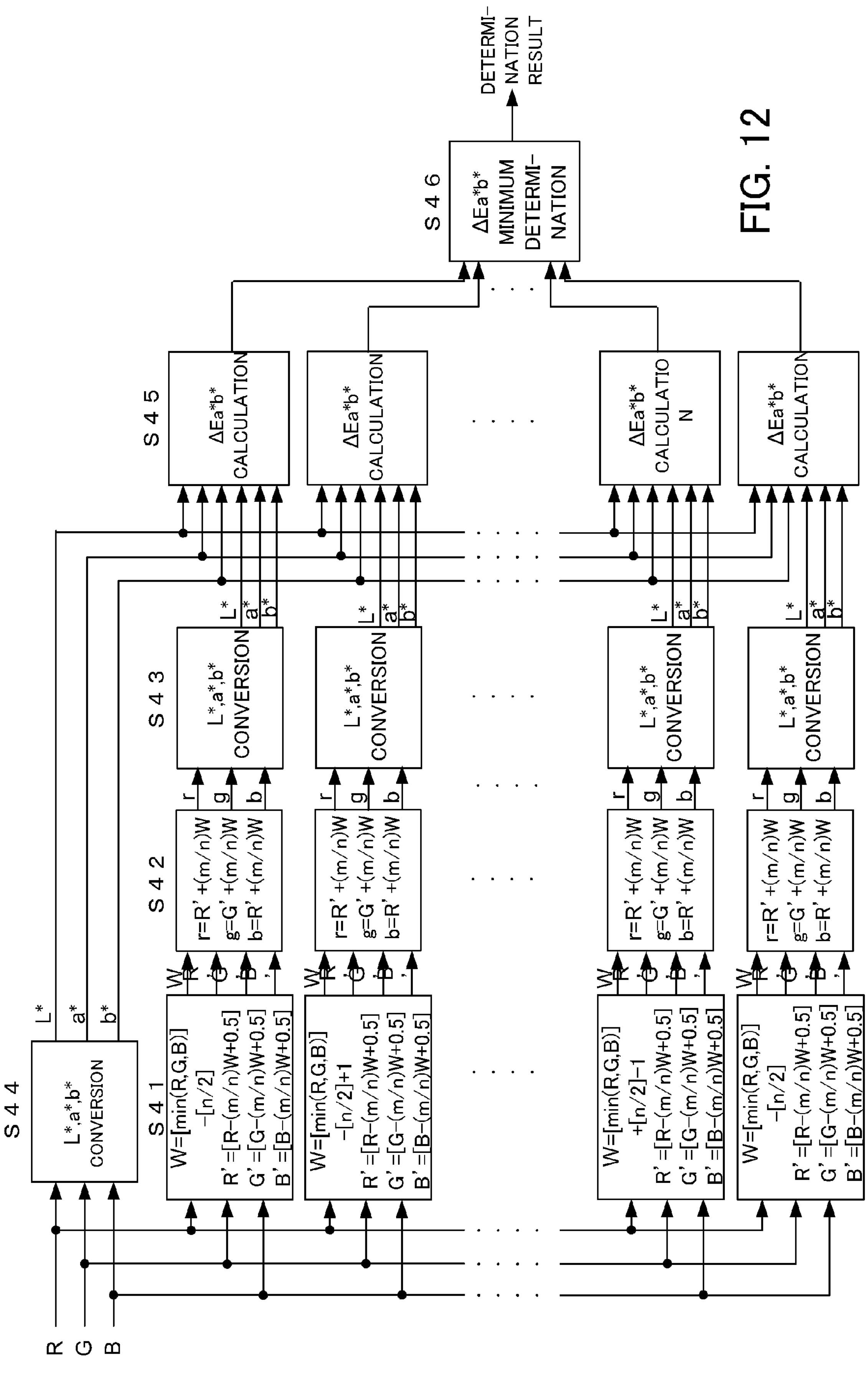
FIG. 12 is a drawing showing a structural example for performing judgement to determine W.

FIG. 12 is a block diagram of a determination section, and in this drawing description is given adopting a color system such as L*a*b*. In S41 and S42, r, g, b are calculated in the same was as for the case of FIG. 11. The obtained r, g, b are then converted to L*, a* and b* (S43). Next, L*, a*, b* obtained from r, g, b after R'G'B'W conversion obtained in S43 are compared with L*, a*b* obtained by directly converting input RGB to L*, a*, b* in S44, and a sum of errors is calculated (S45). In this case also weighted calculation is possible. The lowest error is then selected from among these, to determine a value for W (S46).

In this way, according to this embodiment, when converting from RGB data to R'G'B'W data it is possible to achieve optimum conversion.

Figure 13:
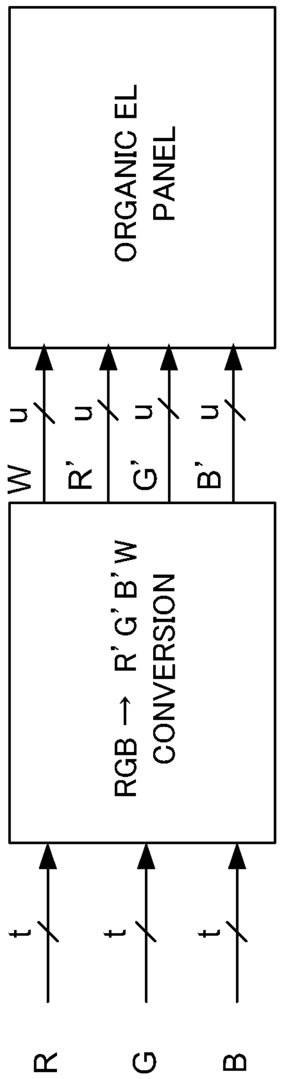
FIG. 13 is a drawing showing the structure of a display device.

The overall structure of a display device of this embodiment is shown in FIG. 13. The RGB data that is the subject of display is input to an RGB→R'G'B'W conversion section. This RGB→R'G'B'W conversion section calculates R'G'B'W data by determining W based on a minimum value for RGB data and a usage rate of W, so that a difference between the RGB data before conversion and r, g, b, being RGB components within the R'G'B'W data after conversion, become small, as described above. The obtained R'G'B'W data is then sent to a display panel 12, and display is carried out by controlling light emission of each pixel based on the data.

What is claimed is:

1. A display device having unit pixels made up of RGBW (red, green, blue, white) subpixels and a usage rate of W set to less than 100%, in which a bit width (t bits) of each color of input RGB data is greater than a bit width (u bits) of each component of R'G'B'W data supplied to a display panel after conversion, wherein R'G'B' values and W values are determined such that differences between respective input RGB data and respective RGB components within converted R'G'B'W data, or an absolute value of a sum of values resulting from multiplication of these differences by a weight, become minimum.

2. The display device of claim 1, wherein

W data is selected from within a range of values greater than or equal to $W_0-[n/2]$ and less than or equal to $W_0+[n/2]$, wherein $W_0$ is a value obtained by rounding off a minimum value within the three colors of input RGB data to u bits, m/n is a representation of a target value for W usage rate, wherein m and n are relatively prime positive integers and m is less than n, and [n/2] is a representation of a value obtained by truncating n/2 after the decimal point.

3. The display device of claim 2, wherein n is used such that $n=2^{(t-u)}$.

4. A display device having unit pixels made up of RGBW (red, green, blue, white) subpixels and a usage rate of W set to less than 100%, in which a bit width (t bits) of each color of input RGB data is greater than a bit width (u bits) of each component of R'G'B'W data supplied to a display panel after conversion, wherein R'G'B' values and W values are determined such that color differences respectively calculated from input RGB data and respective RGB components within converted R'G'B'W data become minimum.

5. The display device of claim 4, wherein

W data is selected from within a range of values greater than or equal to $W_0-[n/2]$ and less than or equal to $W_0+[n/2]$, wherein $W_0$ is a value obtained by rounding off a minimum value within the three colors of input RGB data to u bits, m/n is a representation of a target value for W usage rate, wherein m and n are relatively prime positive integers and m is less than n, and [n/2] is a representation of a value obtained by truncating n/2 after the decimal point.

6. The display device of claim 5, wherein n is used such that $n=2^{(t-u)}$.

* * * * *